(12) United States Patent
Akiyoshi et al.

(10) Patent No.: US 9,722,451 B2
(45) Date of Patent: Aug. 1, 2017

(54) ELECTRONIC UNIT AND POWER FEEDING SYSTEM

(71) Applicant: Sony Corporation, Minato-ku (JP)

(72) Inventors: Koichi Akiyoshi, Chiba (JP); Yoichi Uramoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 241 days.

(21) Appl. No.: 14/366,075

(22) PCT Filed: Dec. 13, 2012

(86) PCT No.: PCT/JP2012/082301
§ 371 (c)(1),
(2) Date: Jun. 17, 2014

(87) PCT Pub. No.: WO2013/111469
PCT Pub. Date: Aug. 1, 2013

(65) Prior Publication Data
US 2014/0333259 A1     Nov. 13, 2014

(30) Foreign Application Priority Data

Jan. 27, 2012 (JP) ................................ 2012-014834
Apr. 17, 2012 (JP) ................................ 2012-093836

(51) Int. Cl.
*H02J 7/00* (2006.01)
*H02J 7/02* (2016.01)
*H01M 10/46* (2006.01)

(52) U.S. Cl.
CPC ............. *H02J 7/025* (2013.01); *H01M 10/46* (2013.01); *H02J 7/0068* (2013.01)

(58) Field of Classification Search
USPC ........................................................ 320/108
See application file for complete search history.

(56) References Cited

U.S. PATENT DOCUMENTS

2008/0150483 A1* 6/2008 Morita .................... H02J 9/061
                                                         320/122
2009/0096413 A1* 4/2009 Partovi .................. H01F 5/003
                                                         320/108

(Continued)

FOREIGN PATENT DOCUMENTS

JP       2005-278273 A     10/2005
JP       2008-182872 A     8/2008
JP       2010-28897 A      2/2010

OTHER PUBLICATIONS

International Search Report issued Feb. 19, 2013 in PCT/JP2012/082301.

*Primary Examiner* — Mohammed Alam
(74) *Attorney, Agent, or Firm* — Chip Law Group

(57) ABSTRACT

An electronic unit includes: an electricity reception section configured to receive power transmitted using one of a magnetic field and an electric field; a secondary battery; a charging section configured to charge the secondary battery based on incoming power received by the electricity reception section; a load configured to perform predetermined operation based on supplied power; a first power supply path running from one of a side of the electricity reception section and a side of the secondary battery to a side of the load via the charging section; and a second power supply path running from the electricity reception section side to the load side around the charging section.

12 Claims, 16 Drawing Sheets

(56) References Cited

U.S. PATENT DOCUMENTS

| | | | | |
|---|---|---|---|---|
| 2009/0108805 A1* | 4/2009 | Liu | ................ | H01F 38/14 |
| | | | | 320/108 |
| 2010/0013321 A1* | 1/2010 | Onishi | ................ | G08C 17/04 |
| | | | | 307/104 |
| 2011/0241616 A1* | 10/2011 | Kim | ................ | H02J 7/025 |
| | | | | 320/108 |
| 2014/0300189 A1* | 10/2014 | Nakano | ................ | H02J 7/025 |
| | | | | 307/31 |

* cited by examiner

ELECTRONIC UNIT AND POWER FEEDING SYSTEM

TECHNICAL FIELD

The present disclosure relates to a power feeding system that performs power supply (electricity transmission or power transmission) in a noncontact manner to a power-feeding objective unit such as an electronic unit, and relates to an electronic unit applicable to such a power feeding system.

BACKGROUND ART

Recently, attention has been focused on a power feeding system (a noncontact power feeding system or a wireless charging system) that performs power supply (electricity transmission or power transmission) in a noncontact manner to CE devices (Consumer Electronics Devices) such as a mobile phone and a portable music player. Such a noncontact power feeding system makes it possible to start charge only by placing an electronic unit (a secondary unit) on a charging tray (a primary unit) instead of inserting (connecting) a connector, such as an AC adaptor, of a power supply unit into a unit. In other words, terminal connection between the electronic unit and the charging tray is not necessary.

An electromagnetic induction method is well known as a method of performing power supply in such a noncontact manner. Recently, attention is further focused on a noncontact power feeding system adopting a method referred to as magnetic resonance method using an electromagnetic resonant phenomenon. For example, PTL 1 to PTL 6 each disclose such a noncontact power feeding system.

CITATION LIST

Patent Literature

[PTL 1]
JP 2001-102974A
[PTL 2]
WO 00/27531A
[PTL 3]
JP 2008-206233A
[PTL 4]
JP 2002-34169A
[PTL 5]
JP 2005-110399A
[PTL 6]
JP 2010-63245A

SUMMARY OF INVENTION

In the meantime, in the noncontact power feeding system as described above, it is generally required to perform appropriate operation in accordance with a state of a load in a power-feeding objective unit such as an electronic unit to improve user convenience.

It is therefore desirable to provide an electronic unit and a power feeding system capable of improving user convenience during power transmission (electricity transmission) using one of a magnetic field and an electric field.

An electronic unit of an embodiment of the present disclosure includes: an electricity reception section configured to receive power transmitted using one of a magnetic field and an electric field; a secondary battery; a charging section configured to charge the secondary battery based on incoming power received by the electricity reception section; a load configured to perform predetermined operation based on supplied power; a first power supply path running from one of a side of the electricity reception section and a side of the secondary battery to a side of the load via the charging section; and a second power supply path running from the electricity reception section side to the load side around the charging section.

A power feeding system of an embodiment of the present disclosure includes: one or more electronic units (power-feeding objective units) of the above-described embodiment of the present disclosure; and a power feeding unit configured to perform power transmission using one of a magnetic field and an electric field to each of the electronic units.

In the electronic unit and the power feeding system of the embodiments of the present disclosure, the secondary battery is charged based on power (incoming power) transmitted using one of a magnetic field and an electric field. In addition, the second power supply path running from the electricity reception section side to the load side around the charging section is provided in addition to the first power supply path running from one of the electricity reception section side and the secondary battery side to the load side via the charging section. Consequently, for example, when the load is started in the case of a small charge amount of the secondary battery, it is avoided that incoming power is not supplied to the load via the charging section. Specifically, even in such a case, part of charged power stored in the secondary battery is supplied to the load through the first power supply path, and incoming power is supplied to the load through the second power supply path. In this way, even in start of the load, etc., since not only the charged power but also incoming power is supplied to the load, a significant decrease in charged power (charge amount) is prevented.

According to the electronic unit and the power feeding system in embodiments of the present disclosure, the first power supply path running from one of the electricity reception section side and the secondary battery side to the load side via the charging section and the second power supply path running from the electricity reception section side to the load side around the charging section are provided; hence, for example, when the load is started in the case of a small charge amount of the secondary battery, it is avoided that incoming power is not supplied to the load via the charging section, and a significant decrease in charge amount is prevented. Consequently, it is possible to improve user convenience during power transmission using one of a magnetic field and an electric field.

DESCRIPTION OF EMBODIMENT

Hereinafter, some embodiments of the present disclosure are described in detail with reference to the accompanying drawings. It is to be noted that description is made in the following order.
1. First embodiment (an example where a first power supply path has a rectifier element).
2. Second embodiment (an example where the first power supply path has a rectifier element and a transistor).
3. Modifications (an example of performing power transmission in a noncontact manner using an electric field, and the like).

First Embodiment

[Overall Configuration of Power Feeding System 4]

Figure 1:
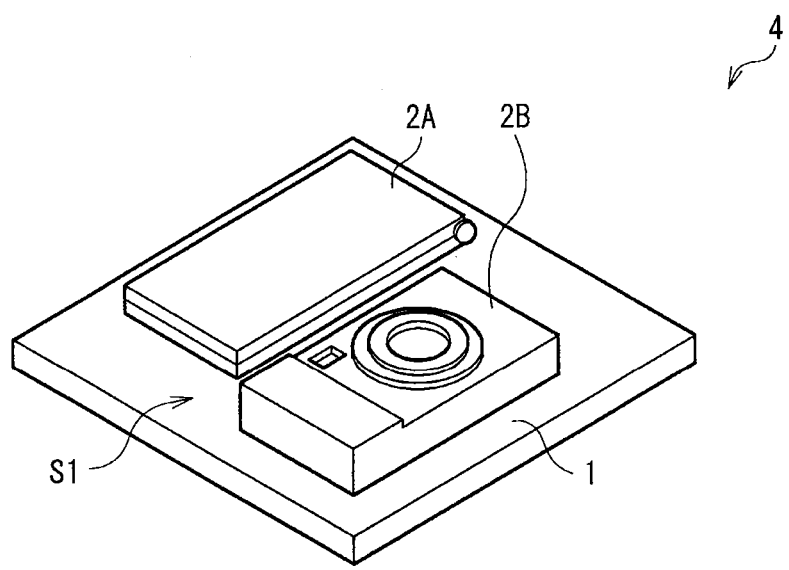
FIG. 1 is a perspective diagram illustrating an exemplary appearance configuration of a power feeding system according to a first embodiment of the present disclosure.
Figure 2:
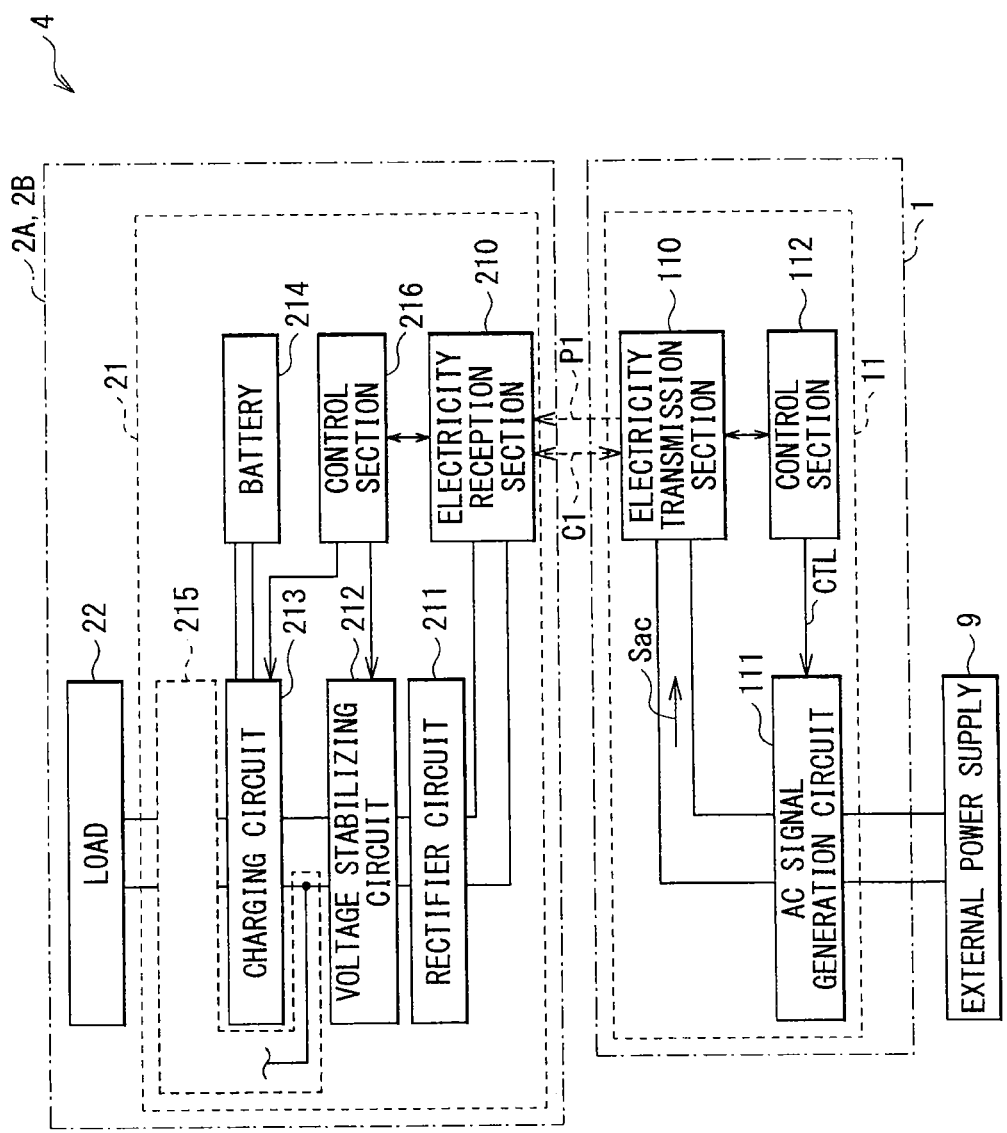
FIG. 2 is a block diagram illustrating an exemplary detailed configuration of the power feeding system illustrated in FIG. 1.

FIG. 1 illustrates an exemplary appearance configuration of a power feeding system (power feeding system 4) according to a first embodiment of the present disclosure. FIG. 2 illustrates an exemplary block configuration of the power feeding system 4. The power feeding system 4 is a system (noncontact power feeding system) that performs power transmission (power supply, power feeding, or electricity transmission) in a noncontact manner using a magnetic field (using magnetic resonance, electromagnetic induction, or the like; the same holds true hereinafter). The power feeding system 4 includes a power feeding unit 1 (primary unit) and one or more electronic units (in this exemplary case, two electronic units 2A and 2B, or secondary units) as power-feeding objective units.

In the power feeding system 4, for example, as illustrated in FIG. 1, the electronic units 2A and 2B are placed on (or disposed close to) a power feeding surface (an electricity transmission surface) S1 of the power feeding unit 1, thereby power transmission is performed from the power feeding unit 1 to the electronic unit 2A or 2B. In this exemplary case, in consideration of a case where power transmission is performed to the plurality of electronic units 2A and 2B in a simultaneous or time-divisional (sequential) manner, the power feeding unit 1 has a mat shape (tray shape), in which area of the power feeding surface S1 is larger than total area of the electronic units 2A and 2B as a power feeding object.

(Power Feeding Unit 1)

As described above, the power feeding unit 1 is a unit (charging tray) configured to perform power transmission (electricity transmission) to the electronic unit 2A or 2B using a magnetic field. For example, as illustrated in FIG. 2, the power feeding unit 1 includes an electricity transmission unit 11 including an electricity transmission section 110, an AC signal generation circuit (a high-frequency power generation circuit) 111, and a control section 112 (electricity transmission control section).

The electricity transmission section 110 includes an electricity transmission coil (a primary coil) L1, capacitors C1$p$ and C1$s$ (resonance capacitors), etc. as described later. The electricity transmission section 110 uses the electricity transmission coil L1 and the capacitors C1$p$ and C1$s$ to perform power transmission (electricity transmission) to the electronic unit 2A or 2B (in detail, an electricity reception section 210 described later) using an AC magnetic field (see power P1 indicated by an arrow in FIG. 2). Specifically, the electricity transmission section 110 has a function of radiating a magnetic field (magnetic flux) from the power feeding surface S1 to the electronic unit 2A or 2B. The electricity transmission section 110 further has a function of performing predetermined intercommunication operation with the electricity reception section 210 described later (see an arrow C1 in FIG. 2).

For example, the AC signal generation circuit 111 is a circuit configured to generate a predetermined AC signal Sac (high-frequency power) for performing electricity transmission using power supplied from an external power supply 9 (a parent power supply) of the power feeding unit 1. For example, such an AC signal generation circuit 111 is configured of a switching amplifier described later. Examples of the external power supply 9 include a power supply (power supply capacity: 500 mA, source voltage: about 5 V) of USB (Universal Serial Bus) 2.0 provided in PC (Personal Computer).

The control section 112 is configured to perform various types of control operation of the power feeding unit 1 as a whole (the power feeding system 4 as a whole). Specifically, the control section 112 has a function of controlling electricity transmission (electricity transmission operation) and communication (communication operation) performed by the electricity transmission section 110, and further has, for example, a function of performing optimization control of power to be fed, a function of authenticating the secondary units, a function of determining that the secondary units are located on the primary unit, and a function of detecting contamination of a dissimilar metal, etc. In the above-described control of electricity transmission, the control section 112 uses a predetermined control signal CTL (a control signal for electricity transmission) described later to control operation of the AC signal generation circuit 111. The control section 112 further has a function of performing modulation processing with pulse width modulation (PWM) described later using the control signal CTL.

(Electronic Units 2A and 2B)

For example, the electronic units 2A and 2B are each a standalone electronic unit typified by a television receiver, a portable electronic unit having a rechargeable battery (battery) typified by a mobile phone and a digital camera. For example, as illustrated in FIG. 2, the electronic units 2A and 2B each include an electricity reception unit 21, and a load 22 that performs predetermined operation, the operation allowing the electronic units to exhibit their functions, based on the power supplied from the electricity reception unit 21. The electricity reception unit 21 includes the electricity reception section 210, a rectifier circuit 211, a voltage stabilizing circuit 212, a charging circuit 213 (charging section), a battery 214 (secondary battery), a power path setting circuit 215, and a control section 216.

The electricity reception section 210 includes an electricity reception coil (secondary coil) L2, capacitors $C2p$ and $C2s$ (resonance capacitors), etc., as described later. The electricity reception section 210 has a function of receiving power transmitted (sent) from the electricity transmission section 110 in the power feeding unit 1 using the electricity reception coil L2, the capacitors $C2p$ and $C2s$, etc. Also, the electricity reception section 210 has the above-described function of performing predetermined intercommunication operation with the electricity transmission section 110 (see the arrow C1 in FIG. 2).

The rectifier circuit 211 is a circuit configured to rectify the power (AC power) supplied from the electricity reception section 210 to generate DC power.

The voltage stabilizing circuit 212 is a circuit configured to perform predetermined voltage stabilization operation based on the DC power supplied from the rectifier circuit 211.

The charging circuit 213 is a circuit configured to charge the battery 214 based on the DC power subjected to voltage stabilization supplied from the voltage stabilizing circuit 212.

The battery 214 stores power in correspondence to charge by the charging circuit 213, and is configured of, for example, a rechargeable battery (secondary battery) such as a lithium ion battery.

As illustrated in FIG. 2, the power path setting circuit 215 is a circuit for setting (controlling) a path (power supply path) for power supply from each of an electricity reception section 210 side (the voltage stabilizing circuit 212) and a battery 214 side to a load 22 side. The power path setting circuit 215 has two power supply paths (power supply paths Lp1 and Lp2) described later. It is to be noted that a detailed configuration of the power path setting circuit 215 is described later (FIG. 3).

The control section 216 is configured to perform various types of control operation of the electronic units 2A and 2B as a whole (the power feeding system 4 as a whole). Specifically, the control section 216 has a function of controlling electricity reception operation and communication operation of the electricity reception section 110, and a function of controlling operation of each of the voltage stabilizing circuit 212, the charging circuit 213, and the like.

[Detailed Configuration of Each of Power Feeding Unit 1 and Electronic Units 2A and 2B]

Figure 3:
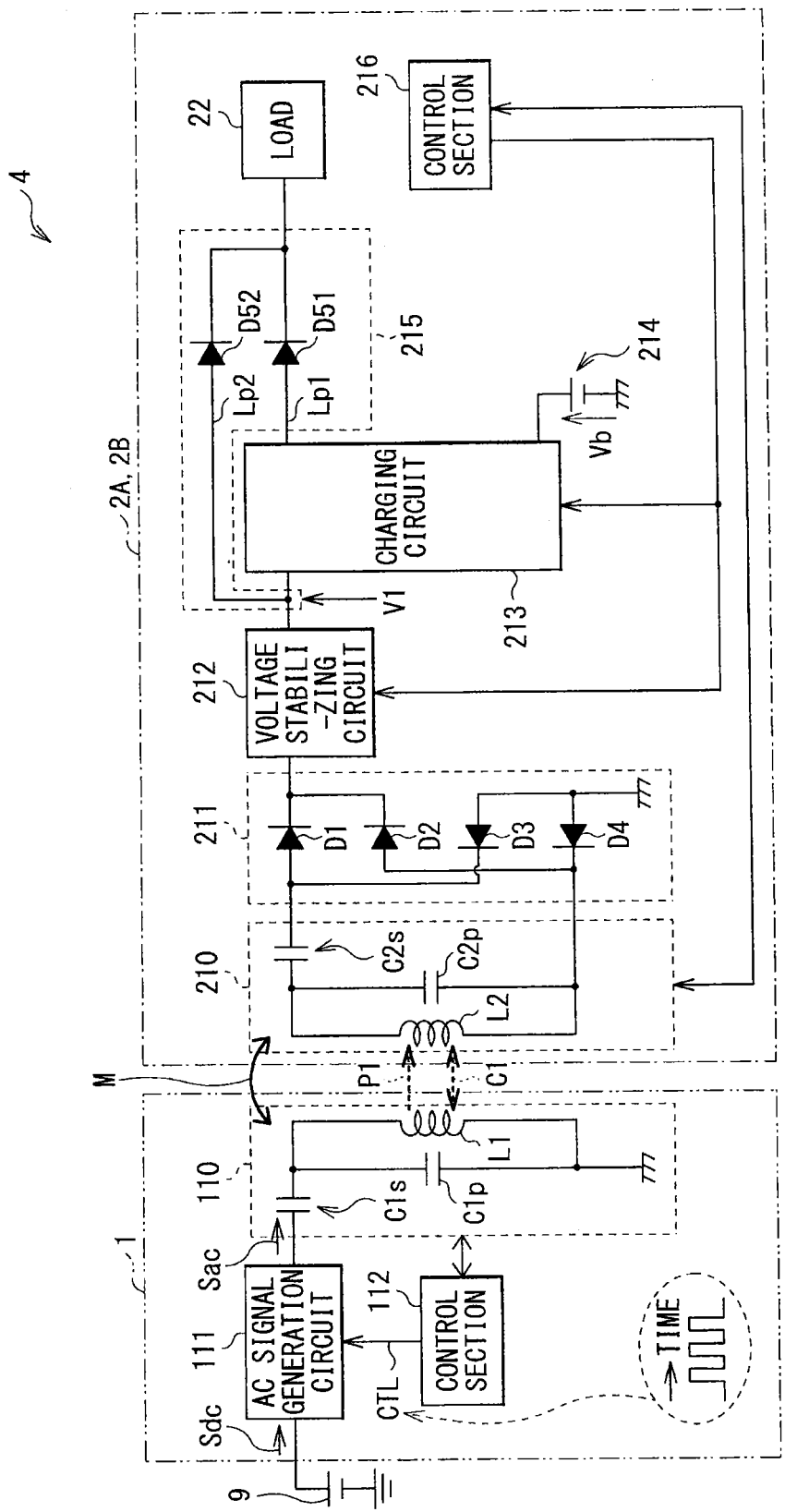
FIG. 3 is a circuit diagram illustrating an exemplary detailed configuration of each of blocks illustrated in FIG. 2.

FIG. 3 is a circuit diagram illustrating an exemplary detailed configuration of each of blocks in the power feeding unit 1 and in the electronic units 2A and 2B illustrated in FIG. 2.

(Electricity Transmission Section 110)

The electricity transmission section 110 includes the electricity transmission coil L1 for performing power transmission using a magnetic field (for generating magnetic flux), and the capacitors $C1p$ and $C1s$ for forming an LC resonance circuit together with the electricity transmission coil L1. The capacitor $C1s$ is electrically connected in series to the electricity transmission coil L1. Specifically, a first end of the capacitor $C1s$ is connected to a first end of the electricity transmission coil L1. Moreover, a second end of the capacitor $C1s$ and a second end of the electricity transmission coil L1 are connected in parallel to the capacitor $C1p$, and a connection end between the electricity transmission coil L1 and the capacitor $C1p$ is grounded.

The LC resonance circuit configured of the electricity transmission coil L1 and the capacitors $C1p$ and $C1s$ is magnetically coupled with an LC resonance circuit configured of an electricity reception coil L2 and capacitors $C2p$ and $C2s$ described later. Consequently, LC resonance operation is performed at a resonance frequency substantially equal to a frequency of the high-frequency power (AC signal Sac) generated by the AC signal generation circuit 111 described later.

(AC Signal Generation Circuit 111)

Figure 4:
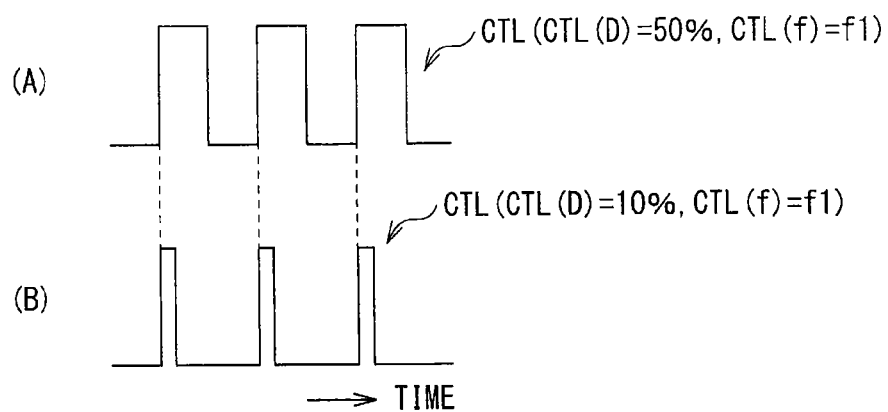
FIG. 4 includes timing waveform diagrams illustrating an exemplary control signal for an AC signal generation circuit.

The AC signal generation circuit 111 is configured of a switching amplifier (so-called a class E amplifier) having one transistor (not shown) as a switching element. The AC signal generation circuit 111 is configured to receive a control signal CTL for electricity transmission from the control section 112. As illustrated in FIG. 3, the control signal CTL is a pulse signal having a predetermined duty ratio. In addition, for example, as illustrated in FIGS. 4(A) and 4(B), pulse width modulation described later is performed through control of the duty ratio of the control signal CTL.

According to such a configuration, in the AC signal generation circuit 111, the above-described transistor performs ON/OFF operation (switching operation at a predetermined frequency and with a predetermined duty ratio) in accordance with the control signal CTL for electricity transmission. Specifically, ON/OFF operation of the transistor as the switching element is controlled using the control signal CTL supplied from the control section 112. Consequently, for example, the AC signal Sac (AC power) is generated based on a DC signal Sdc received from the external power supply 9, and is supplied to the electricity transmission section 110.

(Electricity Reception Section 210)

The electricity reception section 210 includes an electricity reception coil L2 for receiving power (from the magnetic flux) transmitted from the electricity transmission section 110, and capacitors $C2p$ and $C2s$ for forming an LC resonance circuit together with the electricity reception coil L2. The capacitor $C2p$ is electrically connected in parallel to the electricity reception coil L2, while the capacitor $C2s$ is electrically connected in series to the electricity reception coil L2. Specifically, a first end of the capacitor $C2s$ is connected to a first end of the capacitor $C2p$ and to a first end of the electricity reception coil L2. Moreover, a second end of the capacitor $C2s$ is connected to a first input terminal of the rectifier circuit 211, while a second end of the electricity reception coil L2 and a second end of the capacitor C2p are each connected to a second input terminal of the rectifier circuit 211.

The LC resonance circuit configured of the electricity reception coil L2 and the capacitors C2p and C2s is magnetically coupled with the LC resonance circuit configured of the electricity transmission coil L1 and the capacitors C1p and C1s described above. Consequently, LC resonance operation is performed at a resonance frequency that is substantially equal to a frequency of the high-frequency power (AC signal Sac) generated by the AC signal generation circuit 111.

(Rectifier Circuit 211)

In this exemplary case, the rectifier circuit 211 is configured of four rectifier elements (diodes) D1 to D4. Specifically, an anode of the rectifier element D1 and a cathode of the rectifier element D3 are each connected to the first input terminal of the rectifier circuit 211. A cathode of the rectifier element D1 and a cathode of the rectifier element D2 are each connected to an output terminal of the rectifier circuit 211. An anode of the rectifier element D2 and a cathode of the rectifier element D4 are each connected to the second input terminal of the rectifier circuit 211. An anode of the rectifier element D3 and an anode of the rectifier element D4 are each grounded. According to such a configuration, the rectifier circuit 211 rectifies the AC power supplied from the electricity reception section 210, and supplies incoming power as the DC power to the voltage stabilizing circuit 212.

(Charging Circuit 213)

The charging circuit 213 is a circuit configured to charge the battery 214 as described above based on the DC power (incoming power) subjected to voltage stabilization. In this exemplary case, the charging circuit 213 is disposed between the voltage stabilizing circuit 212 and the load 22. Hereinafter, voltage (input voltage) supplied from the voltage stabilizing circuit 212 to the charging circuit 213 is referred to as voltage V1. A battery corresponding to a charge amount (charged power) of the battery 214 is referred to as battery voltage Vb.

(Power Path Setting Circuit 215)

As described above, the power path setting circuit 215 has the two power supply paths (power supply paths Lp1 and Lp2). The power supply path Lp1 (first power supply path) is a path (main path) running from the electricity reception section 210 side (voltage stabilizing circuit 212 side) or the battery 214 side to the load 22 side. On the other hand, the power supply path Lp2 (second power supply path) is a path (bypass path) running from the electricity reception section 210 side (a point on a connection line between the voltage stabilizing circuit 212 and the charging circuit 213) to the load 22 side around (while bypassing) the charging circuit 213.

A rectifier element (diode) is provided on each of the power supply paths Lp1 and Lp2 in a direction along which power is supplied to the load 22 side. Specifically, the rectifier element D51 on the power supply path Lp1 has an anode disposed on an output terminal side of the charging circuit 213, and a cathode disposed on the load 22 side. The rectifier element D52 on the power supply path Lp2 has an anode disposed on the connection line between the voltage stabilizing circuit 212 and the charging circuit 213, and a cathode disposed on the load 22 side. In other words, the respective cathodes of the rectifier elements D51 and D52 are connected in common on the load 22 side.

As described in detail later, the power supply path Lp2 (bypass path) of the two power supply paths Lp1 and Lp2 is valid (in an operation state) only when the load 22 is started and when the charging circuit 213 is in a UVLO mode described later. It is to be noted that the functions (operation) of the power path setting circuit 215 are described in detail later.

[Functions and Effects of Power Feeding System 4]

(1. Summary of Overall Operation)

In the power feeding system 4, the AC signal generation circuit 111 in the power feeding unit 1 supplies the predetermined high-frequency power (AC signal Sac) for power transmission to the electricity transmission coil L1 and the capacitors C1p and C1s (the LC resonance circuit) in the electricity transmission section 110, based on the power supplied from the external power supply 9. Consequently, the electricity transmission coil L1 in the electricity transmission section 110 generates a magnetic field (magnetic flux). At this time, when the electronic units 2A and 2B as power-feeding objective units (charging objective units) are placed on (or disposed close to) a top (the power feeding surface S1) of the power feeding unit 1, the electricity transmission coil L1 in the power feeding unit 1 becomes proximate to the electricity reception coil L2 in the electronic unit 2A or 2B in the vicinity of the power feeding surface S1.

In this way, when the electricity reception coil L2 is disposed close to the electricity transmission coil L1 generating a magnetic field (magnetic flux), electromotive force is induced in the electricity reception coil L2 by the magnetic flux generated from the electricity transmission coil L1. In other words, the magnetic field is generated by electromagnetic induction or magnetic resonance while interlinking with each of the electricity transmission coil L1 and the electricity reception coil L2. Consequently, power transmission is performed from an electricity transmission coil L1 side (the primary side, a power feeding unit 1 side, or an electricity transmission section 110 side) to an electricity reception coil L2 side (the secondary side, an electronic units 2A and 2B side, or an electricity reception section 210 side) (see the power P1 indicated by the arrow in FIGS. 2 and 3). At this time, the electricity transmission coil L1 in the power feeding unit 1 is magnetically coupled with the electricity reception coil L2 in the electronic unit 2A or 2B, so that the LC resonance circuit performs LC resonance operation.

In the electronic unit 2A or 2B, the AC power received by the electricity reception coil L2 is therefore supplied to the rectifier circuit 211, the voltage stabilizing circuit 212, and the charging circuit 213, and the following charging operation is performed. Specifically, the AC power is converted into a predetermined DC power by the rectifier circuit 211, and the DC power is voltage-stabilized by the voltage stabilizing circuit 212, and then the charging circuit 213 charges the battery 214 based on the DC power. In this way, the electronic unit 2A or 2B performs charging operation based on the power received by the electricity reception section 210.

In other words, in the first embodiment, for example, terminal connection to an AC adaptor or the like is not necessary for charge of the electronic unit 2A or 2B, and thus charge is allowed to be easily started (noncontact power feeding is performed) only by placing the electronic units 2A and 2B on (or disposing the electronic units 2A and 2B close to) the power feeding surface S1 of the power feeding unit 1. This leads to a reduced burden of a user.

Figure 5:
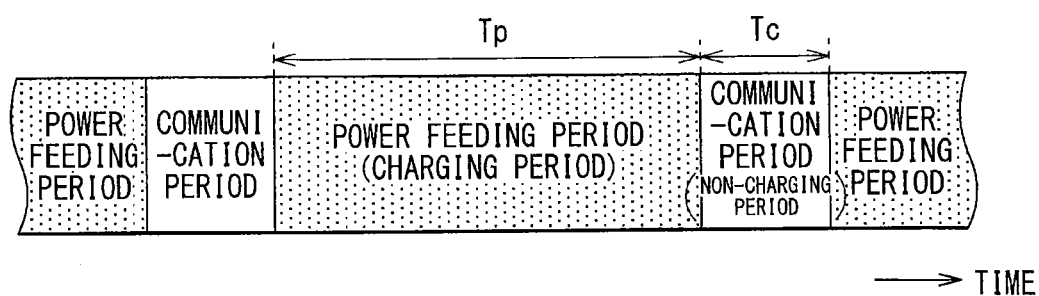
FIG. 5 is a timing diagram illustrating an example of each of a power feeding period and a communication period.

For example, as illustrated in FIG. 5, in such power feeding operation, a power feeding period Tp (charging period of the battery 214) and a communication period Tc (non-charging period) are periodically (or non-periodically)

provided in a time-divisional manner. In other words, the control sections 112 and 216 control the power feeding period Tp and the communication period Tc to be periodically (or non-periodically) set in a time-divisional manner. The communication period Tc is a period during which intercommunication operation using the electricity transmission coil L1 and the electricity reception coil L2 (intercommunication operation for authentication of respective units, control of power feeding efficiency, and the like) is performed between the primary unit (power feeding unit 1) and the secondary unit (electronic unit 2A or 2B) (see the arrow C1 in FIGS. 2 and 3). In this exemplary case, a time ratio of the power feeding period Tp to the communication period Tc is, for example, power feeding period Tp/communication period Tc=about 9/1.

In the communication period Tc, for example, communication operation is performed with pulse width modulation defined by the AC signal generation circuit 111. Specifically, communication is performed with the pulse width modulation through setting of a duty ratio of the control signal CTL in the communication period Tc based on predetermined modulation data. It is in principle difficult to perform frequency modulation during the above-described resonance operation of the electricity transmission section 110 and the electricity reception section 210. Communication operation is therefore easily achieved using such pulse width modulation.

(2. Relationship Between Magnitude of Load 22 and Operation State)

A relationship between magnitude of the load 22 in the electronic unit 2A or 2B and an operation state in the electronic unit 2A or 2B is now described.

Figure 6:
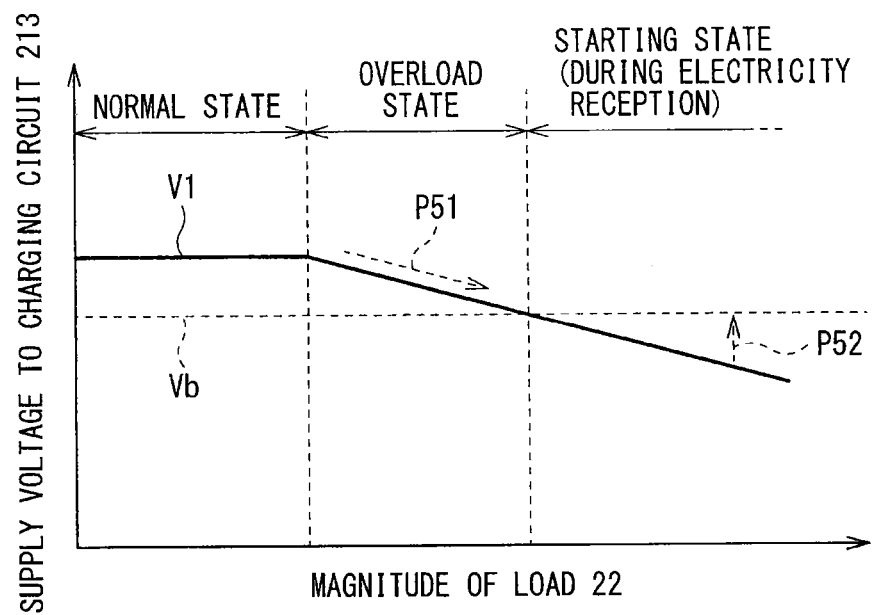
FIG. 6 is a schematic diagram illustrating an example of a relationship between magnitude of a load and a supply voltage to a charging circuit.

FIG. 6 schematically illustrates an example of a relationship between magnitude of the load 22 and a supply voltage to a charging circuit 213 (the above-described supply voltage (voltage V1) from the voltage stabilizing circuit 212 and the battery voltage Vb). As illustrated in FIG. 6, as the magnitude of the load 22 increases in order of a normal state (rated state), an overload state, a starting state during electricity reception (during start of the load 22), magnitude of each of the voltage V1 and the battery voltage Vb is varied. An exemplary operation in the electronic unit 2A or 2B in each of such states is now described in detail.

(2-1. Normal State and Overload State)

First, when the magnitude of the load 22 is in each of the normal state and the overload state, V1≥Vb is established as illustrated in FIG. 6. However, while the voltage V1 is substantially constant in the normal state, the voltage V1 gradually decreases with increase in magnitude of the load 22 in the overload state as illustrated by an arrow P51 in FIG. 6. Such a decrease in voltage V1 in the overload state is because incoming power is drawn more than necessary with increase in load 22.

Figure 7:
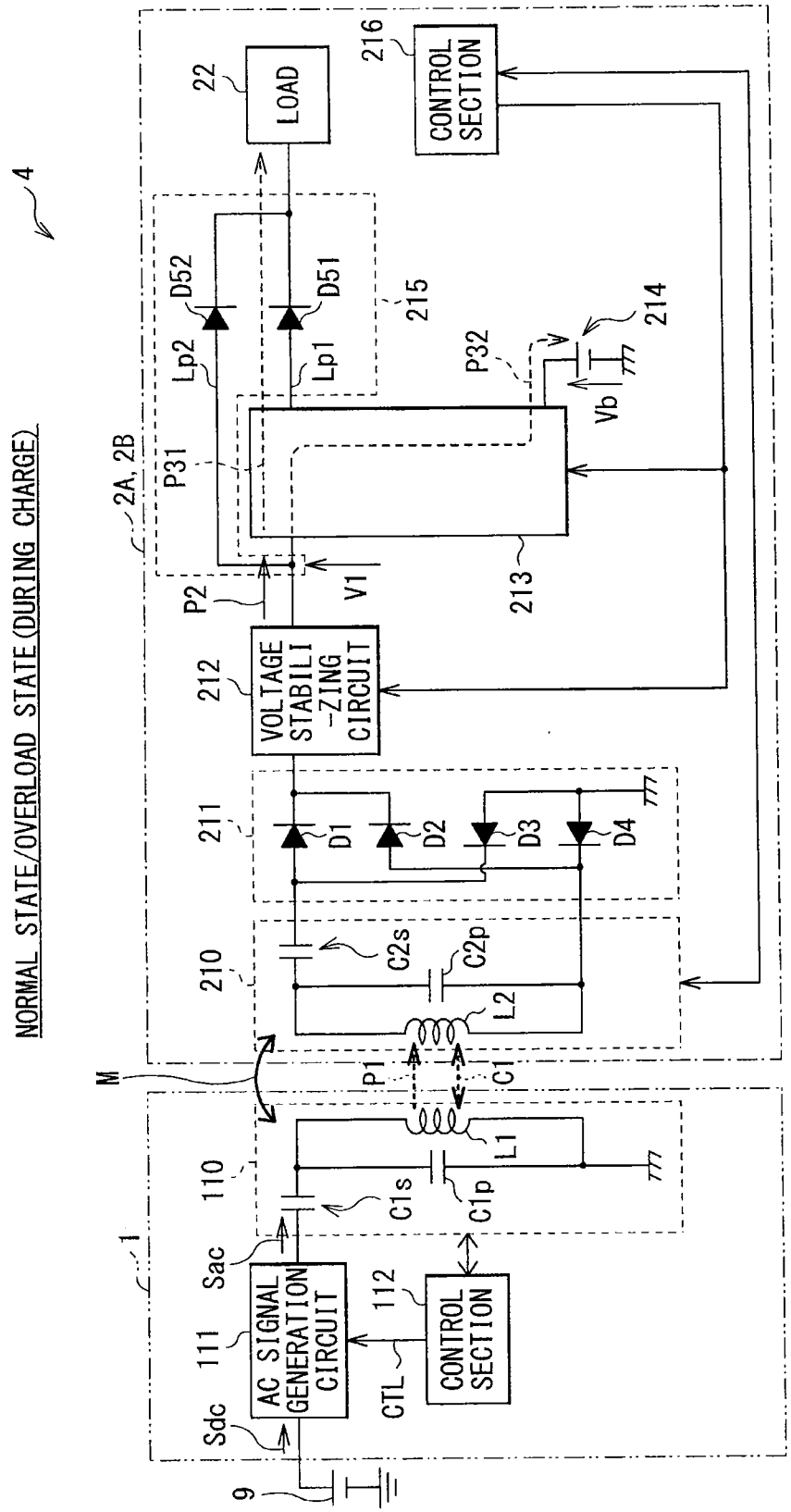
FIG. 7 is a circuit diagram illustrating an exemplary operation during charge in each of a normal state and an overload state of the power feeding system illustrated in FIG. 3.

In this way, since V1≥Vb is established, for example, as illustrated in FIG. 7, in the case of each of the normal state and the overload state, the following operation is performed during charge of the battery 214 (before completion of charge). Specifically, first, the charging circuit 213 supplies power P31 to the load 22 based on power P2 (corresponding to the voltage V1) supplied from the voltage stabilizing circuit 212. Concurrently, the charging circuit 213 charges the battery 214 using surplus power (power P32) given by subtracting power consumed by the load 22 (corresponding to the power P31 supplied to the load 22 side) from the power P2.

Figure 8:
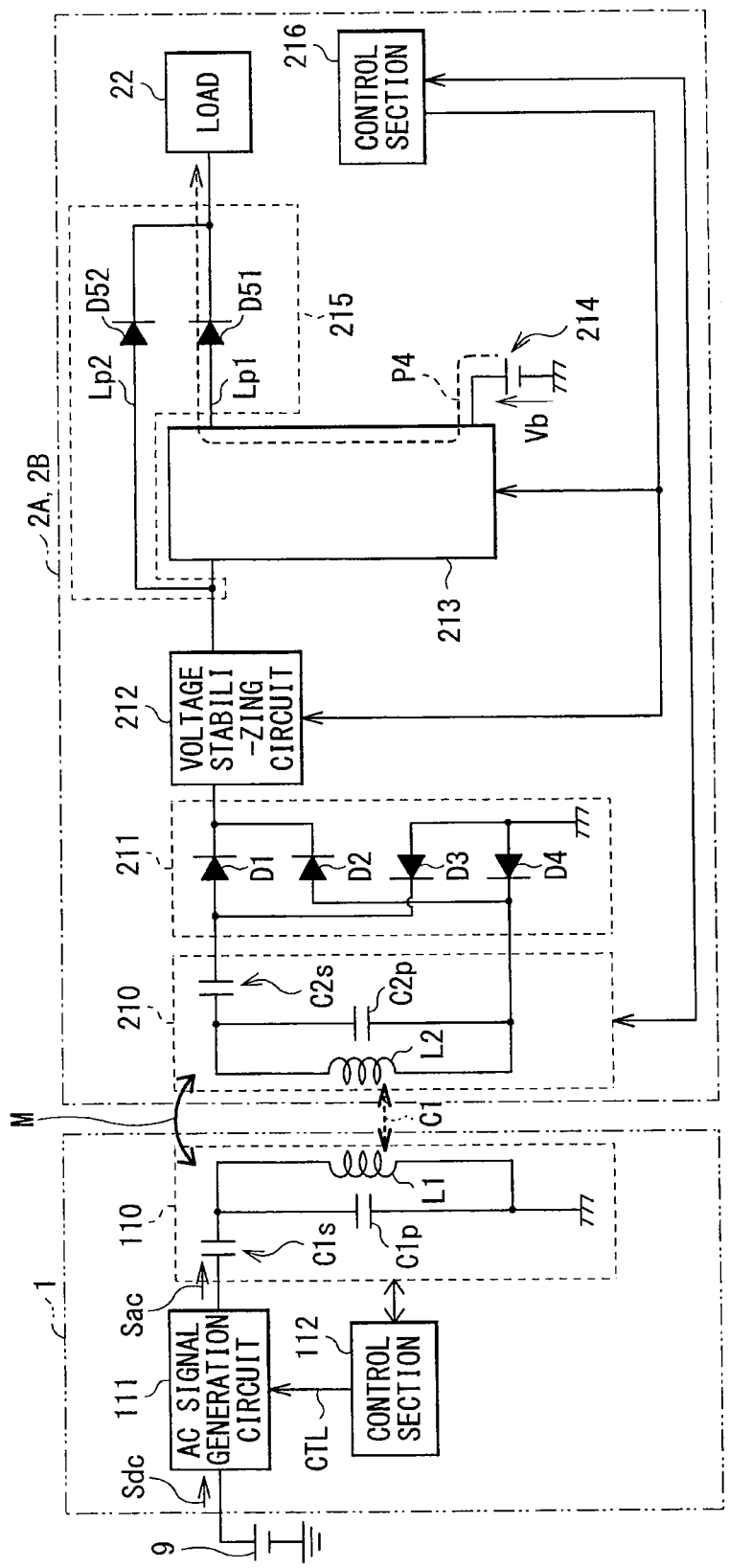
FIG. 8 is a circuit diagram illustrating an exemplary operation after completion of charge in each of the normal state and the overload state of the power feeding system illustrated in FIG. 3.

For example, as illustrated in FIG. 8, the following operation is performed after completion of such charge of the battery 214. Specifically, after completion of the charge, first, electricity transmission (power transmission) using a magnetic field from the power feeding unit 1 side to the electronic unit 2A or 2B is suspended, and the power P2 (voltage V1) is therefore not supplied to the charging circuit 213 unlike the above-described charging period. The power P31 is therefore not supplied to the load 22 via the charging circuit 213. In addition, the charging circuit 213 does not charge the battery 214 with the power 32 (surplus power). After completion of such charge, part (power P4) of charged power stored in the battery 214 is supplied to the load 22 via the charging circuit 213.

(2-2. Starting State During Electricity Reception)

On the other hand, when the load 22 is in a starting state during electricity reception, the voltage V1 further decreases with increase in magnitude of the load 22; hence, V1<Vb is given as illustrated in FIG. 6. This causes a problem of impairing user convenience in a comparative example 1 described later. This is now described in detail.

Specifically, first, a noncontact power feeding system is typically inferior (low) in power transmission efficiency compared with a wired power feeding system (a power feeding system using an AC adaptor or the like). For example, when power is supplied using the same parent power supply (maximum power 2.5 W) of USB 2.0, power loss is necessarily great in the noncontact system compared with the wired system. This is because the noncontact power feeding system is designed such that DC power is temporarily converted into AC power, and power feeding is performed using an AC magnetic field in a noncontact manner, and then the AC power is converted into DC power again. Power corresponding to "conversion efficiency" in such power conversion corresponds to loss.

For example, power transmission efficiency in power feeding by the noncontact system is assumed to be 50%. In such a case, if power is received by the wired system, the power transmission efficiency is substantially close to 100%; hence, it is possible to receive power of 2.5 W from the above-described parent power supply of USB 2.0. On the other hand, since the noncontact system has the power transmission efficiency of 50% as described above, received power is decreased to 1.25 W.

In this case, when the maximum power consumption of the electronic unit (power-feeding objective unit) is assumed to be 2.0 W, the wired system has a margin (surplus power) of 0.5 W (=2.5 W−2.0 W). On the other hand, the noncontact system has a minus margin of 0.75 W (=1.25 W−2.0 W). In the noncontact power feeding system, to compensate such a minus margin (power shortage), part of charged power in the charged secondary battery is supplied to the load (see an arrow P52 in FIG. 6) in the electronic unit as in the above-described case illustrated in FIG. 8 (after completion of charge).

In this way, when the load in the electronic unit is started during charge (in a starting state of the load during electricity reception), the maximum power consumption (corresponding to the above-described power P31) in the electronic unit exceeds the incoming power (corresponding to the above-described power P2) provided by the noncontact power feeding using the magnetic field. In other words, V1<Vb is given as described above. Consequently, the following problem may occur in a comparative example 1 described below.

Comparative Example 1

Figure 9:
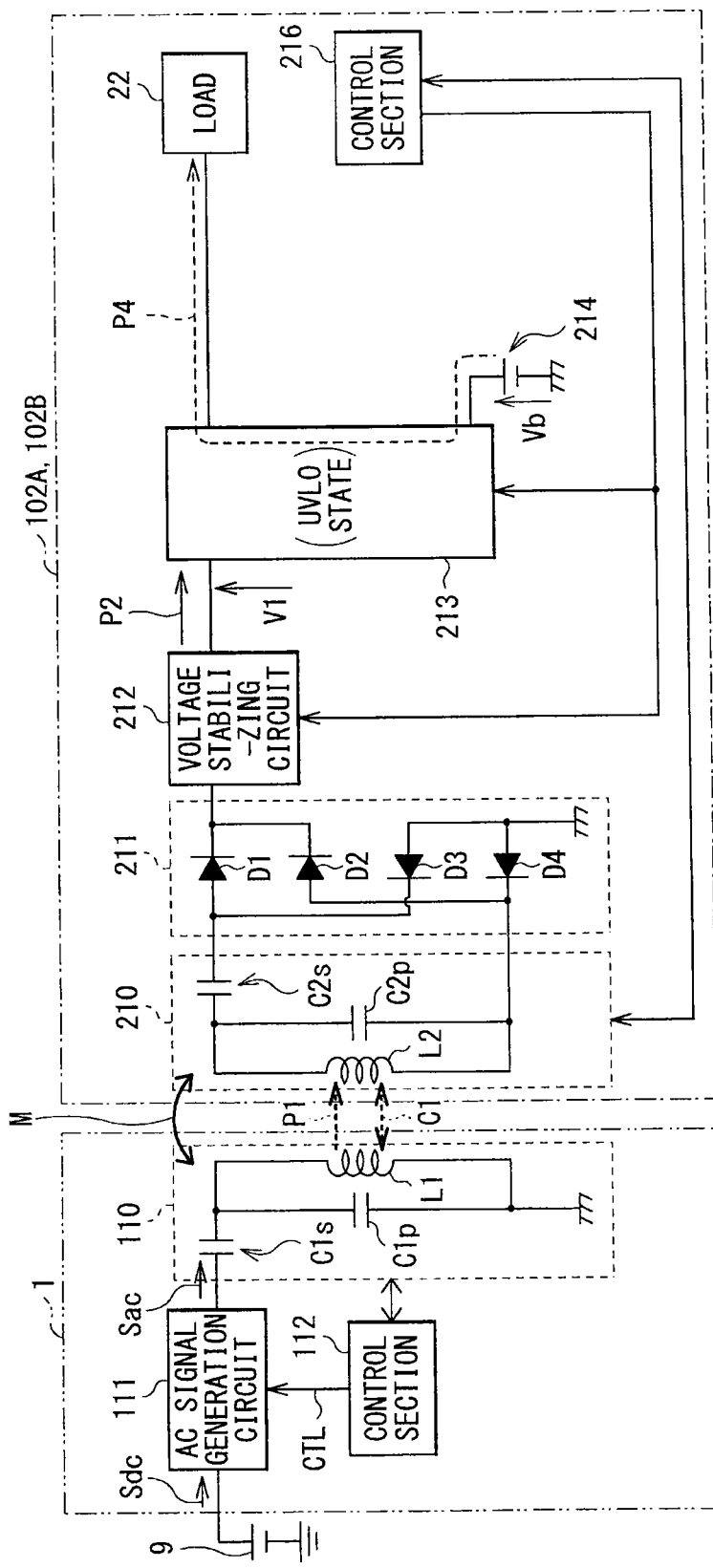
FIG. 9 is a circuit diagram illustrating operation in a starting state during electricity reception according to a comparative example 1.

FIG. 9 is a block diagram as a circuit diagram illustrating an exemplary configuration of a power feeding system 104 according to the comparative example 1. The power feeding system 104 corresponds to a power feeding system in which each of electronic units 102A and 102B does not incorporate the power path setting circuit 215 in the first embodiment.

First, in the comparative example 1, when the load 22 is started (in a starting state during charge), part of charged power (power P4) in the battery 214 is supplied to the load 22 via the charging circuit 213.

When a charge amount of the battery 214 is small (for example, in the case of Vb=about 3V) during such start of the load 22, an input voltage (the voltage V1) to the charging circuit 213 is drastically decreased, and the charging circuit 213 is turned into a so-called UVLO (Under Voltage Lock Out) mode. If the charging circuit 213 is turned into the UVLO mode, as illustrated in FIG. 9, the charging circuit 213 receives no incoming power (power P2) using a magnetic field from the voltage stabilizing circuit 212 side. In other words, the incoming power using the magnetic field is not supplied to the load 22 via the charging circuit 213.

Figure 10:
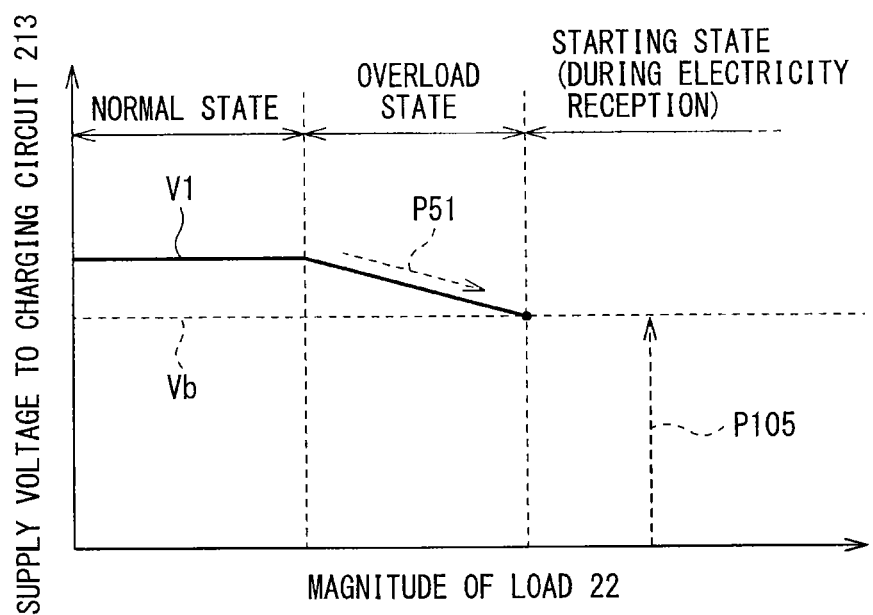
FIG. 10 is a schematic diagram illustrating a relationship between magnitude of a load and a supply voltage to a charging circuit according to the comparative example 1.

Hence, for example, as shown by an arrow P105 illustrated in FIG. 10, in the starting state during electricity reception in the comparative example 1, all power consumed in the load 22 side is filled by the charged power (power P4, or battery voltage Vb) in the battery 214. As a result, remaining power (charged power) in the battery 214 continuously decreases, and user convenience is impaired.

Comparative Example 2

Figure 11:
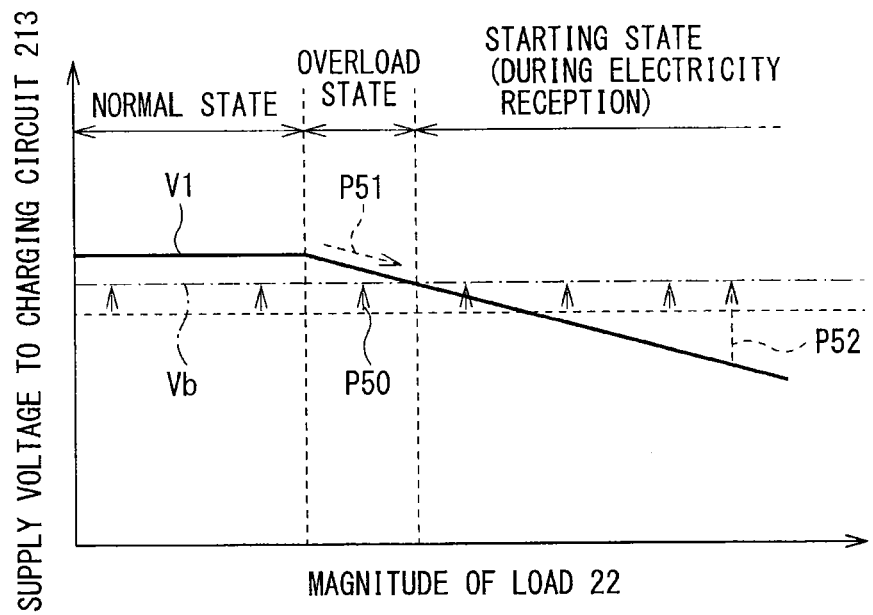
FIG. 11 is a schematic diagram illustrating a relationship between magnitude of a load and a supply voltage to a charging circuit according to a comparative example 2.

For example, as in a comparative example 2 illustrated in FIG. 11, there is considered a technique in which the battery voltage Vb is boosted in the charging circuit 213 (see an arrow P50 in FIG. 11), and then such a boosted battery voltage Vb is supplied to the load 22 side. This makes it possible to solve the problem due to the UVLO mode as in the comparative example 1. However, when such a boosting operation is performed, cost and/or mounting area increases in correspondence to a provided booster circuit.

First Embodiment

In the power feeding system 4 of the first embodiment, therefore, the power supply path Lp2 as a bypass path is provided in addition to the power supply path Lp1 as a main path in the power path setting circuit 215 in the electronic unit 2A or 2B. The power supply path Lp1 is a path running from the electricity reception section 210 side or the battery 214 side to the load 22 side via the charging circuit 213. On the other hand, the power supply path Lp2 is a path running from the electricity reception section 210 side to the load 22 side around the charging circuit 213.

In the first embodiment, such two power supply paths Lp1 and Lp2 are provided, thereby the problem of the comparative example 1 is solved without adding the booster circuit (while additional elements are minimized) unlike the comparative example 2. Specifically, for example, when the load 22 is started in the case of a small charge amount of the battery 214, it is avoided that incoming power (the above-described power P2) using a magnetic field is not supplied to the load 22 via the charging section 213.

Figure 12:
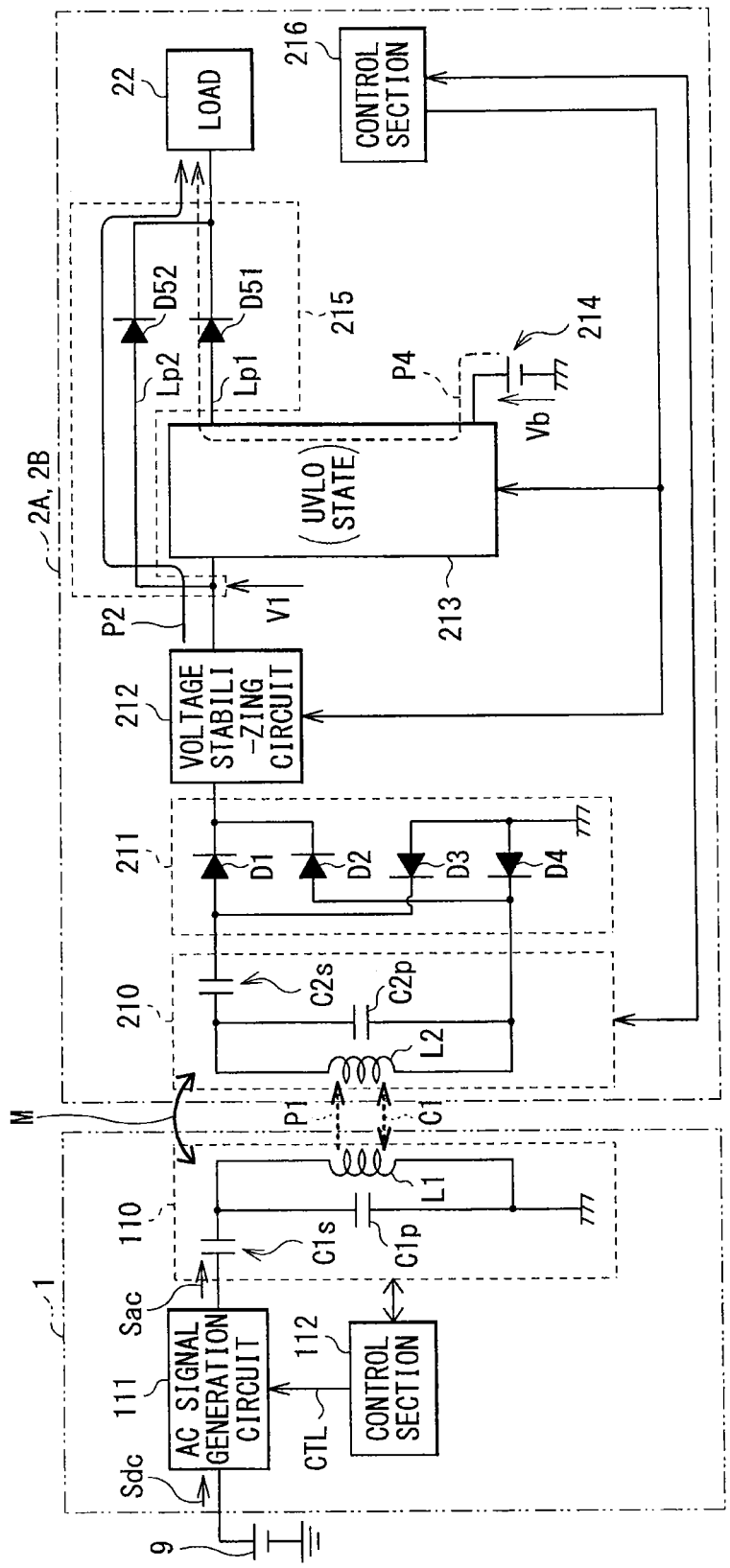
FIG. 12 is a circuit diagram illustrating an exemplary operation in a starting state during electricity reception according to Example 1 of the first embodiment.

Specifically, for example, as in Example 1 of the first embodiment illustrated in FIG. 12, when the load 22 is in the starting state during electricity reception, the power path setting circuit 215 performs the following operation. First, as in the comparative example 1, part (power P4) of the charged power stored in the battery 214 is supplied to the load 22 through the power supply path Lp1 (rectifier element D51).

In the Example 1, as in the comparative example 1, if the charging circuit 213 is turned into the UVLO mode, the charging circuit 213 receives no incoming power (power P2) using a magnetic field from the voltage stabilizing circuit 212 side. In other words, the incoming power using the magnetic field is not supplied to the load 22 via the charging circuit 213 (supply of the incoming power to the load 22 through the power supply path Lp1 is suspended). In the Example 1, however, unlike the comparative example 1, the incoming power (power P2) using the magnetic field is supplied to the load 22 through the power supply path Lp2 (rectifier element D52).

In this way, even if the load 22 is started in the case of a small charge amount of the battery 214, part of the charged power in the battery 214 is supplied to the load 22 through the power supply path Lp1, and the incoming power using the magnetic field is supplied to the load 22 through the power supply path Lp2. In other words, the incoming power (power P2) is supplied to the load 22 in addition to the charged power (power P4) even during start of the load 22. Hence, unlike the comparative example 1, the charged power (charge amount) in the battery 214 is prevented from being significantly decreased.

In the power path setting circuit 215, the power supply path Lp2 (bypass path) of the two power supply paths Lp1 and Lp2 is valid (in an operation state) only in the starting state of the load 22 during electricity reception (only when the charging circuit 213 is in the UVLO mode). Specifically, in the starting state of the load 22 during electricity reception, the power supply path Lp2 is also valid in addition to the power supply path Lp1. In other words, the power supply path Lp2 is invalid (does not operate) in any of states other than the starting state of the load 22 during electricity reception, such as the normal state and the overload state of the load 22 as illustrated in FIG. 7. Thus, in the power path setting circuit 215, the power supply path Lp1 is automatically switched to be valid or invalid depending on magnitude of the load 22, and the control section 216 or the like is not necessary to perform control.

As described above, in the first embodiment, there are provided the power supply path Lp1 running from the electricity reception section 210 side or the battery 214 side to the load 22 side via the charging circuit 213, and the power supply path Lp2 running from the electricity reception section 210 side to the load 22 side around the charging circuit 213. Consequently, for example, when the load 22 is started in the case of a small charge amount of the battery 214, it is avoided that incoming power is not supplied to the load 22 via the charging circuit 213, and a significant decrease in charge amount is prevented. Specifically, even if the charging circuit 213 is into the UVLO mode due to overload, it is possible to ensure a power supply path for supply of the incoming power to the load 22 side. Consequently, it is possible to improve user convenience during power transmission using a magnetic field. The charging circuit 213 tends to be into the UVLO mode, for example, in the case where the voltage stabilizing circuit 212 is not allowed to output a specified output voltage value due to the overload state.

Second Embodiment

A second embodiment of the present disclosure is now described. It is to be noted that the same components as those in the first embodiment are designated by the same numerals, and description thereof is appropriately omitted.

[Configuration of Power Feeding System 4A]

Figure 13:
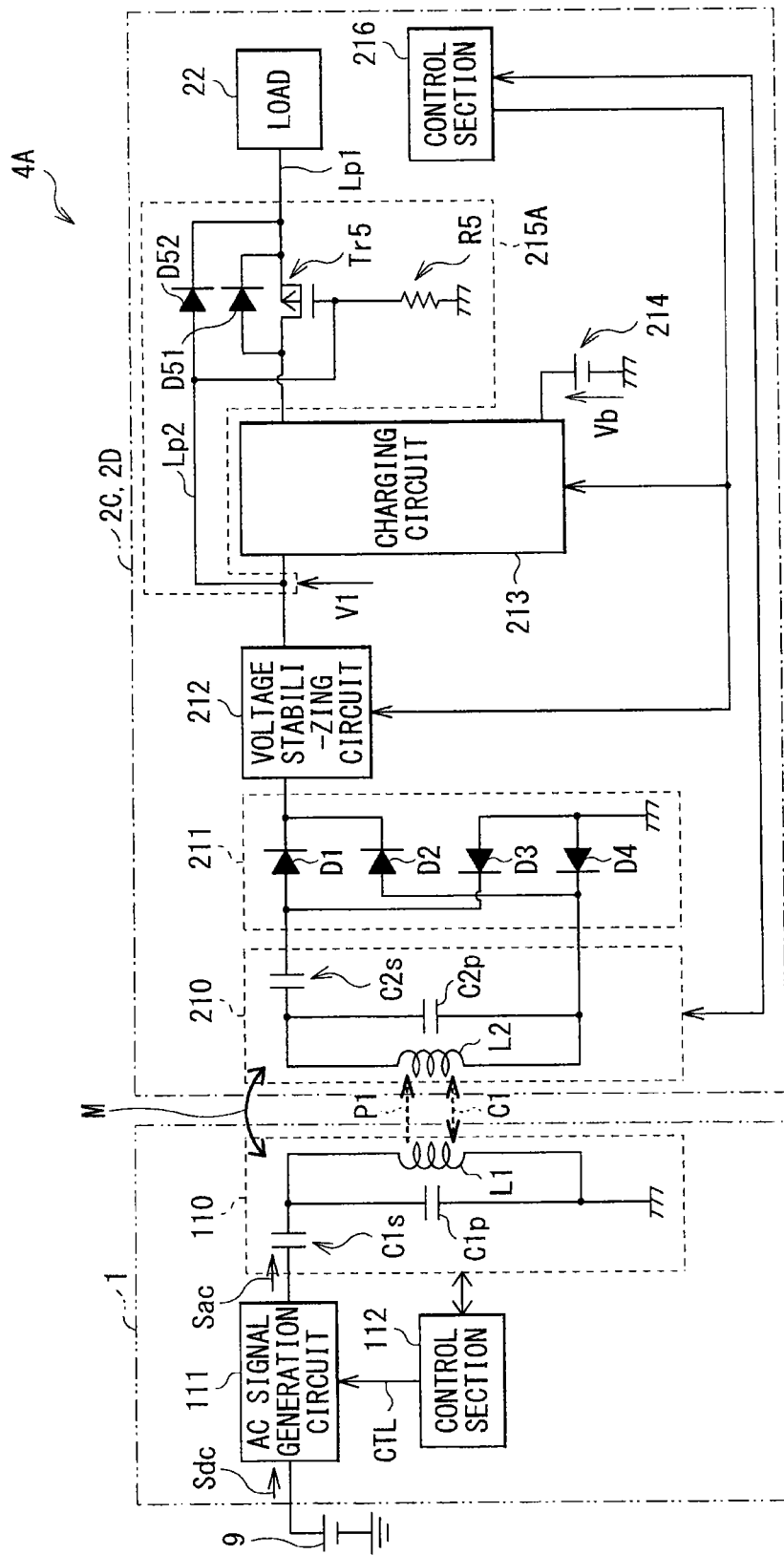
FIG. 13 is a circuit diagram illustrating an exemplary configuration of a power feeding system according to a second embodiment.

FIG. 13 is a block diagram as a circuit diagram illustrating an exemplary configuration of a power feeding system (power feeding system 4A) according to the second embodiment. The power feeding system 4A has a configuration similar to that of the power feeding system 4 of the first embodiment except that electronic units 2C and 2D are provided as the power-feeding objective units in place of the electronic units 2A and 2B.

The electronic units 2C and 2D have configurations similar to those of the electronic units 2A and 2B, respectively, except that a power path setting circuit 215A described below is provided in place of the power path setting circuit 215.

(Power Path Setting Circuit 215A)

The power path setting circuit 215A has two power supply paths Lp1 and Lp2 as with the power path setting circuit 215. Rectifier elements D51 and D52 are provided on the power supply paths Lp1 and Lp2, respectively, in a direction along which power is supplied to the load 22 side. However, in the power path setting circuit 215A, a transistor Tr5 connected in parallel to the rectifier element D51 is further provided on the power supply path Lp1 in addition to such rectifier elements D51 and D52. Moreover, a resistance element R5 connected to the transistor Tr5 is also provided. In other words, the power path setting circuit 215A has a configuration equivalent to that of the power path setting circuit 215 except that the transistor Tr5 and the resistance element R5 are further provided.

In this exemplary case, the transistor Tr5 is configured of a p-type FET (Field Effective Transistor). The transistor Tr5 has a gate connected to a first end of the resistance element R5 and an anode of the rectifier element D52, a source connected to an anode of the rectifier element D51, and a drain connected to a load 22 side (each of cathode sides of the rectifier elements D51 and D52). In this exemplary case, a second end of the resistance element R5 is connected to an earth (a ground).

[Functions and Effects of Power Feeding System 4A]

In the power feeding system 4A having such a configuration, the power path setting circuit 215A in the electronic unit 2C or 2D performs operation in the following manner in accordance with the magnitude of the load 22 (in one of the normal state, the overload state, and the starting state during electricity reception).

(Normal State and Overload State: During Charge)

Figure 14:
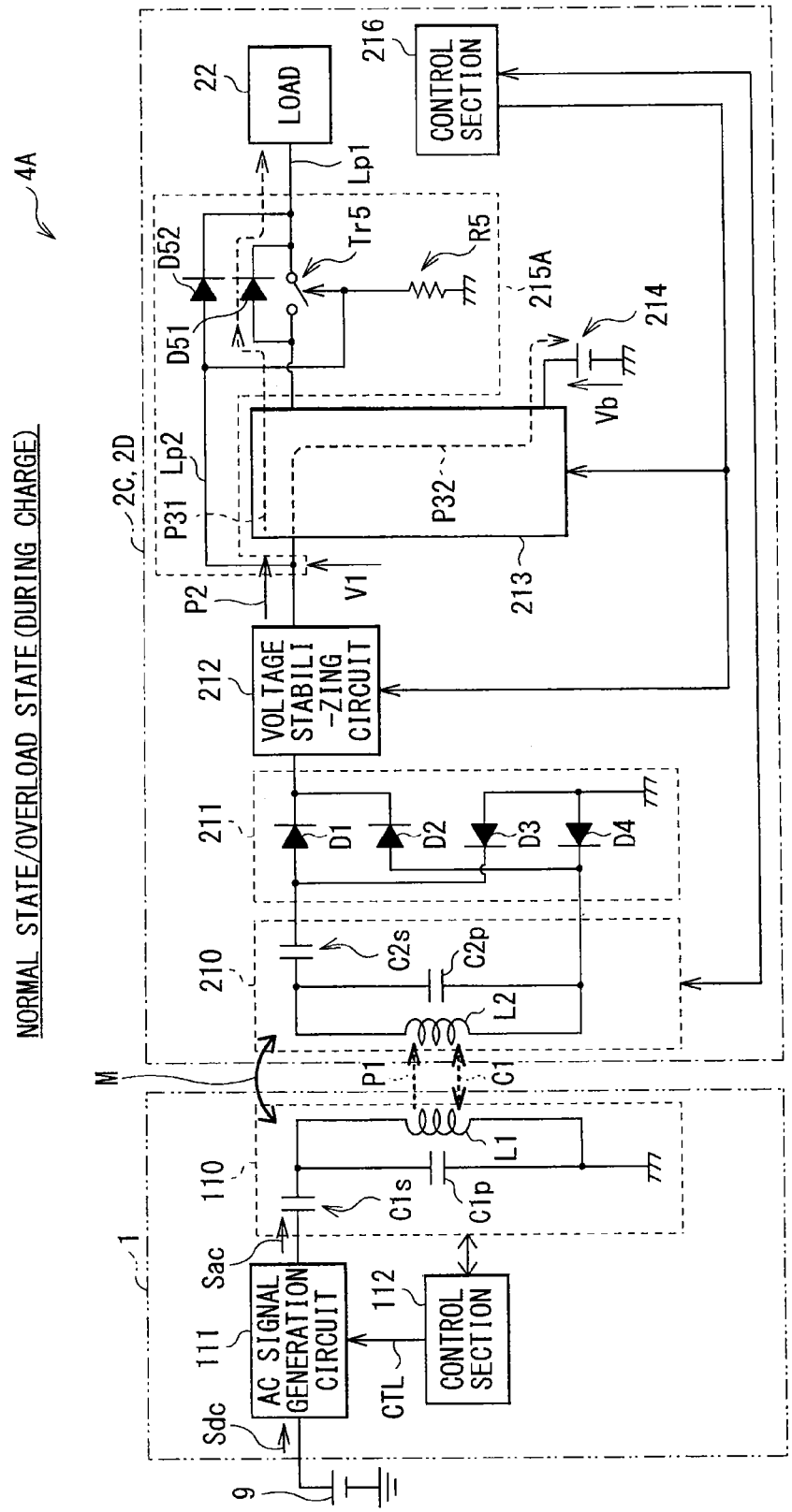
FIG. 14 is a circuit diagram illustrating an exemplary operation during charge in each of a normal state and an overload state of the power feeding system illustrated in FIG. 13.

First, when the magnitude of the load 22 is in the normal state or the overload state, for example, as illustrated in FIG. 14, the following operation is performed during charge (before completion of charge) of the battery 214. That is, basically as in the first embodiment, the charging circuit 213 supplies the power P31 to the load 22 based on the power P2 (corresponding to the voltage V1) supplied from the voltage stabilizing circuit 212. Concurrently, the charging circuit 213 charges the battery 214 using surplus power (the power P32) given by subtracting power consumed by the load 22 (corresponding to the power P31 supplied to the load 22 side) from the power P2.

At this time, on the power supply path Lp1 in the power path setting circuit 215A, while the rectifier element D51 is turned on to allow a current flow (to form a power supply path), the transistor Tr5 is turned off to allow no current flow (to form no power supply path).

(Starting State During Electricity Reception)

Figure 15:
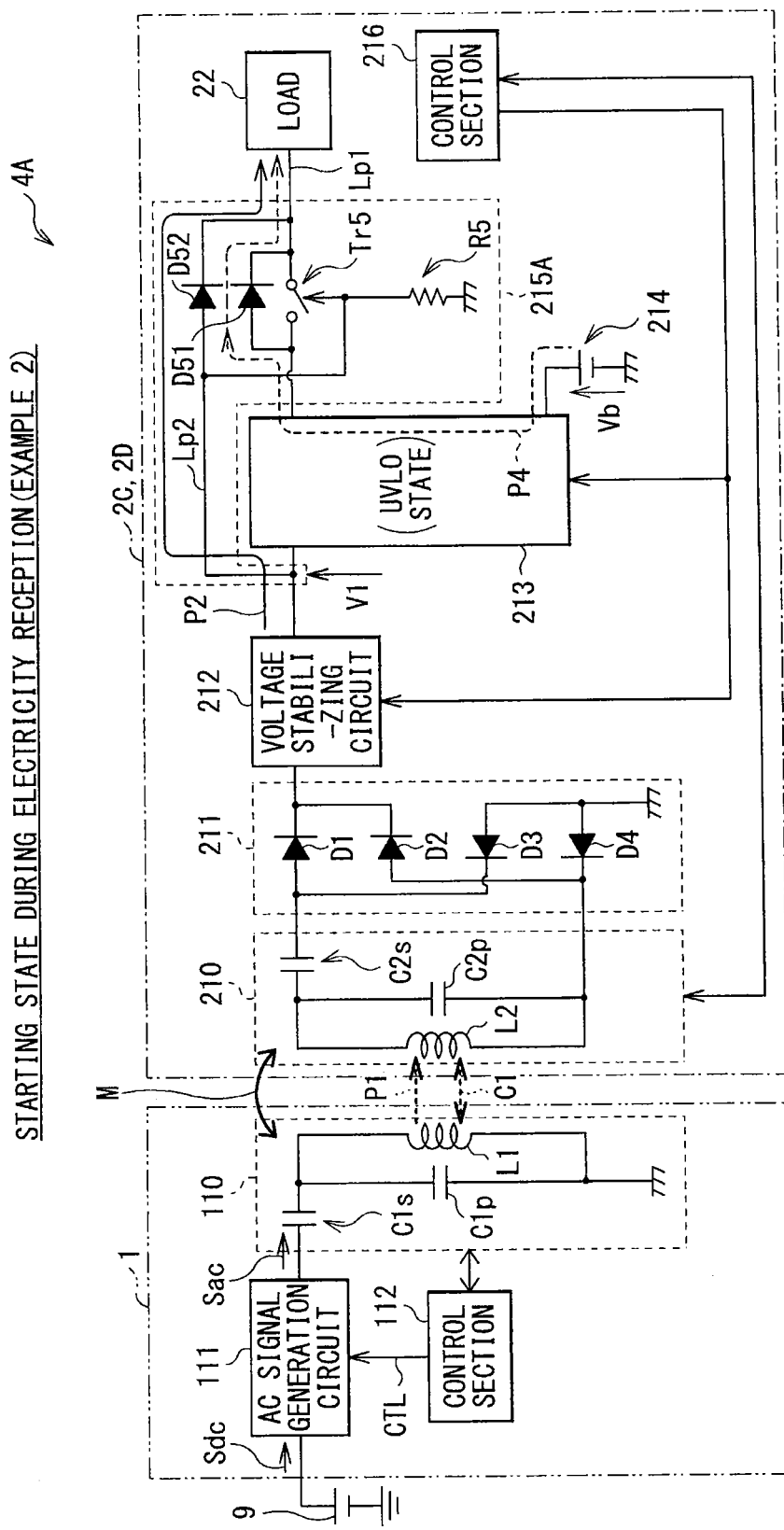
FIG. 15 is a circuit diagram illustrating an exemplary operation in a starting state during electricity reception according to Example 2 of the second embodiment.

On the other hand, when the load 22 is in the starting state during electricity reception, for example, operation is performed as in Example 2 of the second embodiment as illustrated in FIG. 15. Specifically, basically as in the Example 1 of the first embodiment, part (power P4) of the charged power stored in the battery 214 is supplied to the load 22 through the power supply path Lp1. If the charging circuit 213 is turned into the UVLO mode, while the charging circuit 213 receives no power P2 from the voltage stabilizing circuit 212 side, the power P2 is supplied to the load 22 through the power supply path Lp (rectifier element D52).

In this case, as with each of the normal state and the overload state, the following behavior occurs on the power supply path Lp1 in the power path setting circuit 215A. Specifically, while the rectifier element D51 is turned on to allow a current flow (to form a power supply path), the transistor Tr5 is turned off to allow no current flow (to form no power supply path).

In this way, in the second embodiment, the power path setting circuit 215A is provided, thereby similar effects are provided through functions similar to those of the first embodiment. In addition, in the second embodiment, the power path setting circuit 215A further has the transistor Tr5, thereby the following effect is allowed to be further provided in addition to the effects of the first embodiment.

(Normal Use State: During Start of Load Using Part of Charged Power)

Figure 16:
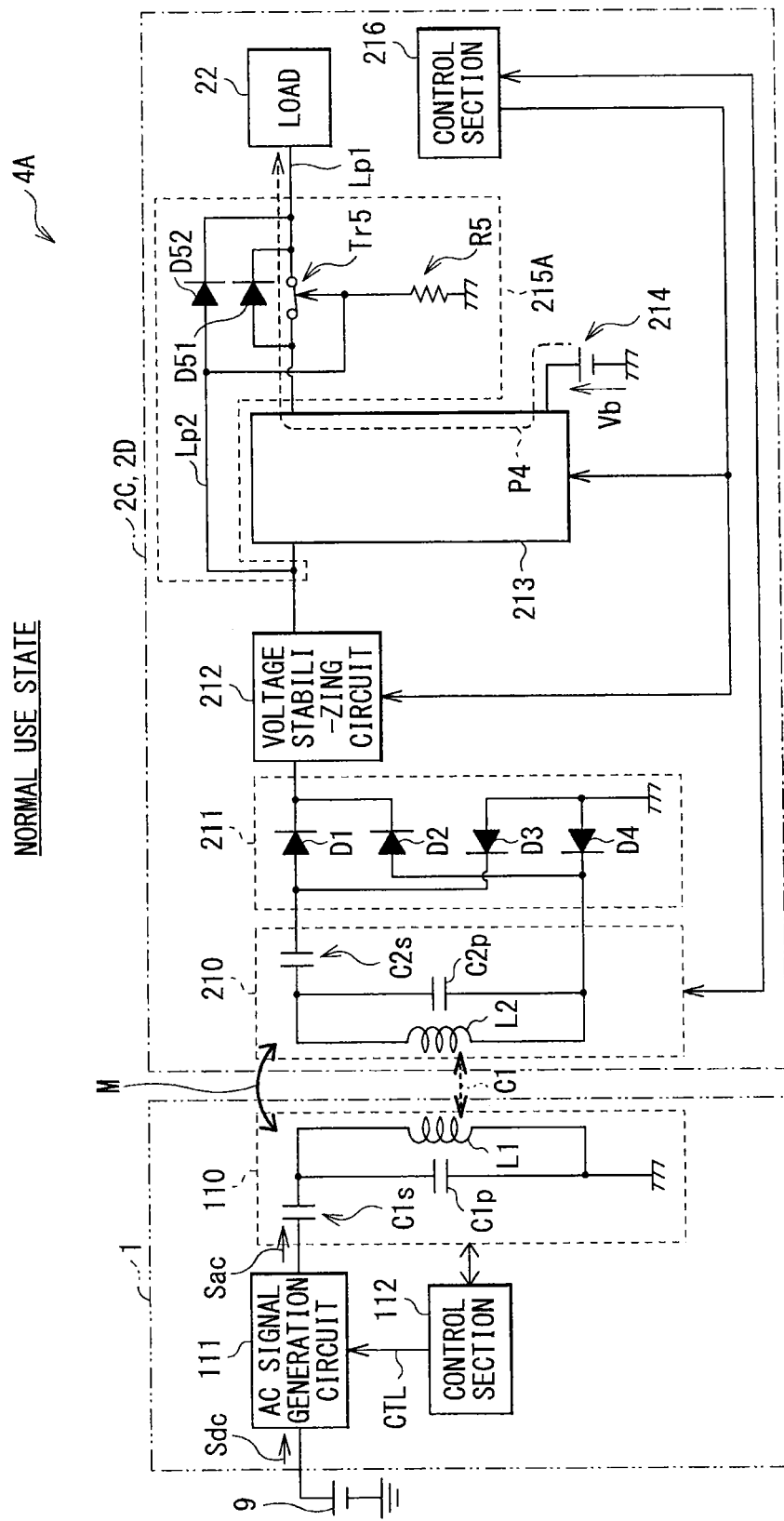
FIG. 16 is a circuit diagram illustrating an exemplary operation in a normal use state according to the second embodiment.

Specifically, for example, as illustrated in FIG. 16, when the incoming power (power P2 or P31) is not supplied to the load 22, and when part (power P4) of the charged power stored in the battery 214 is supplied to the load 22 to start the load 22 (the normal use state), the following behavior occurs on the power supply path Lp1 in the power path setting circuit 215A. Specifically, contrary to the previous description, while the rectifier element D51 is turned off to allow no current flow (to form no power supply path), the transistor Tr5 is turned on to allow a current flow (to form a power supply path). That is, on the power supply path Lp1, the transistor Tr5 is ON only in the normal use state. On the other hand, since the transistor Tr5 is ON, the rectifier element D51 receives no forward voltage, i.e., is OFF. Consequently, in the power path setting circuit 215A, unlike the power path setting circuit 215, when the load 22 is started using only part of the charged power (in the case of the normal use state), power loss in the rectifier element D51 is avoided, making it possible to improve use efficiency of the charged power. In this case, it may be said that power loss is greatly advantageously prevented since available power is limited (finite) unlike the case of performing power supply to the load 22 using the incoming power.

<Modifications>

Although the technology of the present disclosure has been described with the first and second embodiments hereinbefore, the technology is not limited thereto, and various modifications or alterations thereof may be made.

For example, although the above-described embodiments are described with various coils (the electricity transmission coil and the electricity reception coil), configurations (shapes) of such coils may include any of various types. Specifically, each coil may have, for example, a spiral shape, a loop shape, a bar shape using a magnetic material, an a-round shape including a spiral coil that is disposed in two layers in a folded manner, a spiral shape having more layers, and a helical shape with a winding wound in a thickness direction. Each coil may be not only a winding coil configured of a conductive wire rod, but also a conductive pattern coil configured of a printed circuit board or a flexible printed circuit board.

Further, although the above-described embodiments have been described with electronic units as an example of the power-feeding objective unit, the power-feeding objective unit is not limited thereto, and may be a unit (for example, a vehicle such as an electric car) other than the electronic units.

Furthermore, although the above-described embodiments have been described with the specific components of the power feeding unit and the electronic units, it is not necessary to provide all of the components. Also, other components may be further provided. For example, the power feeding unit or the electronic units may incorporate a communication function, a certain control function, a display function, an authentication function of a secondary unit, and a function of detecting contamination of a dissimilar metal, etc. Furthermore, a configuration of the power path setting circuit (power supply path) is not limited to those in the above-described embodiments, and may be another configuration. For example, the power path setting circuit (power supply path) described in each of the above-described embodiments may be provided (incorporated) in the charging circuit (charging section). Specifically, for example, the power supply paths Lp1 and Lp2 and the rectifier elements D51 and D51 may be incorporated in the charging circuit 213. Furthermore, a connection point between cathode sides of the rectifier elements D51 and D52 (a junction of the power supply paths Lp1 and Lp2) may also be incorporated in the charging circuit 213. Furthermore, transistors may be used in place of the rectifier elements (rectifier elements D51 and D52) in the power path setting circuit. In such a case, it is possible to reduce power loss compared with a case of using the rectifier elements.

In addition, although the above-described embodiments have been described with an exemplary case where a plurality of (two) electronic units are provided in the power feeding system, such a case is not limitative, and only one electronic unit may be provided in the power feeding system.

Furthermore, although the above-described embodiments have been described with a charging tray for a small electronic unit (CE unit) such as a mobile phone as an example of the power feeding unit, the power feeding unit is not limited to such a household charging tray, and may be applicable as a charger of any of various electronic units. Moreover, the power feeding unit may not necessarily be a tray, and may be, for example, a stand for an electronic unit, such as a so-called cradle.

(Example of Power Feeding System Performing Power Transmission in Noncontact Manner Using Electric Field)

Although the above-described embodiments have been described with an exemplary case of the power feeding system that performs power transmission (power feeding) from the power feeding unit as a primary unit to the electronic unit as a secondary unit in a noncontact manner with a magnetic field, this is not limitative. Specifically, the contents of the disclosure are applicable to a power feeding system that performs power transmission from a power feeding unit as a primary unit to an electronic unit as a secondary unit in a noncontact manner with an electric field (electric field coupling). In such a case, it is possible to obtain effects similar to those in the above-described embodiments.

Figure 17:
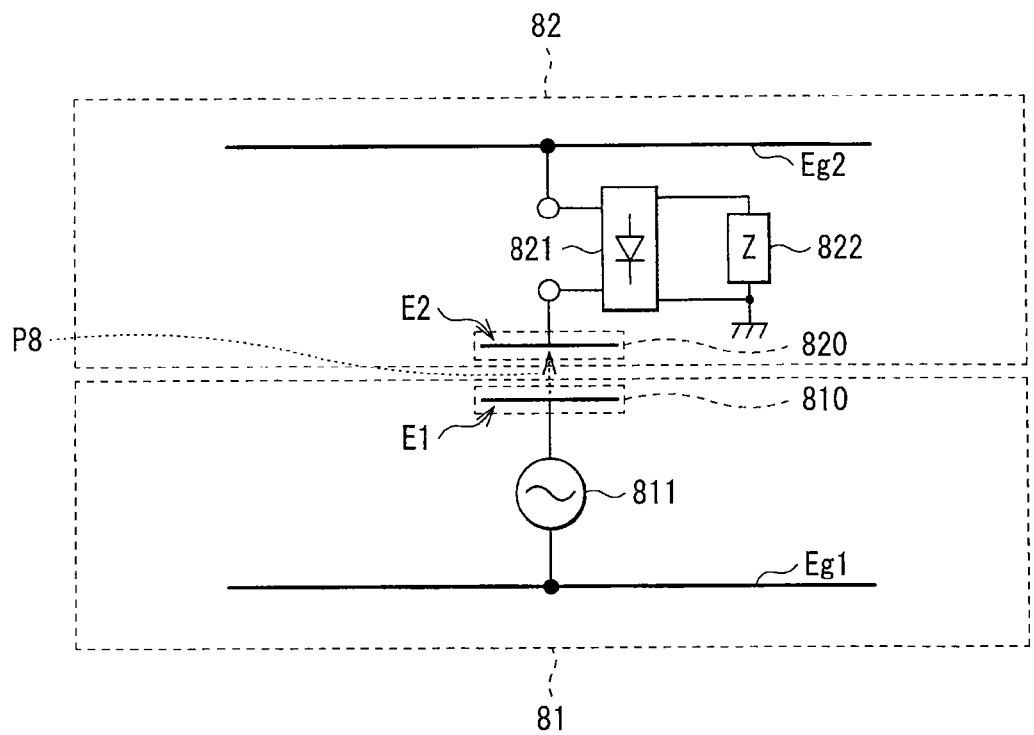
FIG. 17 is a block diagram illustrating an exemplary schematic configuration of a power feeding system according to a modification.

Specifically, for example, a power feeding system illustrated in FIG. 17 includes one power feeding unit 81 (a primary unit) and one electronic unit 82 (a secondary unit). The power feeding unit 81 mainly includes an electricity transmission section 810 including an electricity transmission electrode E1 (a primary electrode), an AC signal source 811 (an oscillator), and an earth electrode Eg1. The electronic unit 82 mainly includes an electricity reception section 820 including an electricity reception electrode E2 (a secondary electrode), a rectifier circuit 821, a load 822, and an earth electrode Eg2. That is, this power feeding system includes two sets of electrodes, i.e., the electricity transmission electrode E1 and the electricity reception electrode E2, and the earth electrodes Eg1 and Eg2. In other words, the power feeding unit 81 (primary unit) and the electronic unit 82 (secondary unit) each incorporate an antenna configured of a pair of asymmetric electrode structures such as a monopole antenna.

Figure 18:
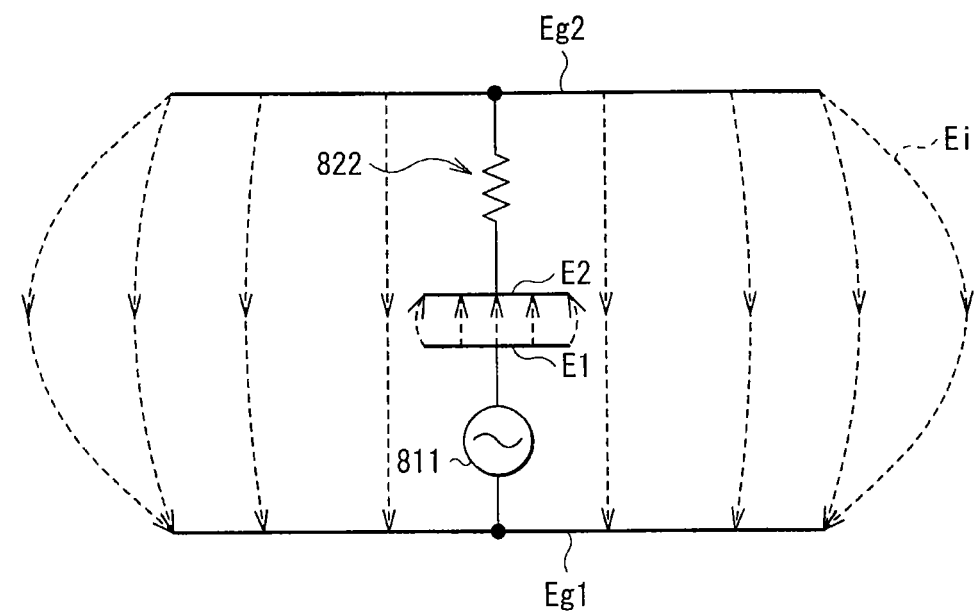
FIG. 18 is a schematic diagram illustrating an exemplary transmission mode of an electric field in the power feeding system illustrated in FIG. 17.

In the power feeding system having such a configuration, when the electricity transmission electrode E1 and the electricity reception electrode E2 are opposed to each other, the above-described noncontact antennas are coupled to each other (electrically coupled to each other along a vertical direction of each electrode). An induction electric field is therefore generated between the electrodes, so that power transmission using the electric field is performed (see power P8 illustrated in FIG. 17). Specifically, for example, as schematically illustrated in FIG. 18, the generated electric field (an induction electric field Ei) is transmitted from the electricity transmission electrode E1 to the electricity reception electrode E2, while the generated induction electric field Ei is transmitted from the earth electrode Eg2 to the earth electrode Eg1. In other words, a loop path of the generated induction electric field Ei is formed between the primary unit and the secondary unit. In such a noncontact power supply system using the electric field, it is also possible to obtain the effects similar to those in the above-described embodiments through use of each of the techniques similar to those of the above-described embodiments.

It is to be noted that the present technology may have the following configurations.

(1) An electronic unit, including:

an electricity reception section configured to receive power transmitted using one of a magnetic field and an electric field;

a secondary battery;

a charging section configured to charge the secondary battery based on incoming power received by the electricity reception section;

a load configured to perform predetermined operation based on supplied power;

a first power supply path running from one of a side of the electricity reception section and a side of the secondary battery to a side of the load via the charging section; and a second power supply path running from the electricity reception section side to the load side around the charging section.

(2) The electronic unit according to (1), wherein the first and second power supply paths each have a rectifier element.

(3) The electronic unit according to (2), wherein the first power supply path further has a transistor connected in parallel to the rectifier element.

(4)

The electronic unit according to (3), wherein on the first power supply path, when the incoming power is supplied to the load, the transistor is turned off, and the rectifier element is turned on.

(5)

The electronic unit according to (3) or (4), wherein on the first power supply path, when the incoming power is not supplied to the load, and when part of charged power stored in the secondary battery is supplied to the load to start the load, the transistor is turned on, and the rectifier element is turned off.

(6)

The electronic unit according to any one of (2) to (5), wherein the rectifier element is disposed in a direction along which power is supplied to the load side.

(7)

The electronic unit according to any one of (1) to (6), wherein the second power supply path is valid when the charging section is in a UVLO (Under Voltage Lock Out) mode.

(8)

The electronic unit according to (7), wherein when the charging section is in the UVLO mode, supply of the incoming power to the load through the first power supply path is suspended.

(9)

The electronic unit according to (8), wherein when the charging section is in the UVLO mode, the incoming power is supplied to the load through the second power supply path, and part of charged power stored in the secondary battery is supplied to the load through the first power supply path.

(10)

The electronic unit according to any one of (1) to (9), wherein the first and second power supply paths are provided in the charging section.

(11)

A power feeding system, including:

one or more electronic units; and a power feeding unit configured to perform power transmission using one of a magnetic field and an electric field to each of the electronic units, wherein the electronic unit includes an electricity reception section configured to receive power transmitted from the power feeding unit, a secondary battery, a charging section configured to charge the secondary battery based on incoming power received by the electricity reception section, a load configured to perform predetermined operation based on supplied power, a first power supply path running from one of a side of the electricity reception section and a side of the secondary battery to a side of the load via the charging section, and a second power supply path running from the electricity reception section side to the load side around the charging section.

This application claims the priority benefit of Japanese Patent Application JP 2012-14834 filed in the Japan Patent Office on Jan. 27, 2012 and Japanese Patent Application JP 2012-93836 filed in the Japan Patent Office on Apr. 17, 2012, the entire content of each of which is incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic unit, comprising:
    an electricity reception section configured to receive power transmitted based on one of a magnetic field or an electric field;
    a secondary battery;
    a charging section configured to charge the secondary battery based on the received power;
    a load configured to operate based on the received power;
    a first power supply path configured to connect the electricity reception section and the secondary battery to the load via the charging section; and
    a second power supply path configured to bypass the charging section to connect the electricity reception section to the load side, and
    wherein the received power is supplied to the load through one of the first power supply path or the second power supply path based on a magnitude of the load.

2. The electronic unit according to claim 1, wherein each of the first power supply path and the second power supply path comprises a rectifier element.

3. The electronic unit according to claim 2, wherein the first power supply path further comprises a transistor connected in parallel to the rectifier element.

4. The electronic unit according to claim 3, wherein on the first power supply path, based on a determination that the received power is supplied to the load, the transistor is turned off and the rectifier element is turned on.

5. The electronic unit according to claim 3, wherein on the first power supply path, based on an absence of the supply of the received power to the load and a determination that a part of charged power stored in the secondary battery is supplied to the load to start the load, the transistor is turned on and the rectifier element is turned off.

6. The electronic unit according to claim 2, wherein the rectifier element is arranged in a direction along which the received power is supplied to the load side.

7. The electronic unit according to claim 1, wherein the second power supply path is valid based on a determination that the charging section is in an Under Voltage Lock Out (UVLO) mode,
    wherein based on the magnitude of the load in the UVLO mode, an input voltage of the charging section is decreased to less than a determined threshold value.

8. The electronic unit according to claim 7, wherein based on the determination that the charging section is in the UVLO mode, supply of the received power to the load through the first power supply path is suspended.

9. The electronic unit according to claim 8, wherein based on the determination that the charging section is in the UVLO mode, the received power is supplied to the load through the second power supply path, and
    a part of charged power stored in the secondary battery is supplied to the load through the first power supply path.

10. The electronic unit according to claim 1, wherein the first power supply path and the second power supply path are provided in the charging section.

11. A power feeding system, comprising:
    one or more electronic units; and
    a power feeding unit configured to transmit power based on one of a magnetic field or an electric field to each of the one or more electronic units,
    wherein each of the one or more electronic units includes:
    an electricity reception section configured to receive power transmitted from the power feeding unit;

a secondary battery;

a charging section configured to charge the secondary battery based on the received power;

a load configured to operate based on the received power;

a first power supply path configured to connect the electricity reception section and the secondary battery to the load via the charging section; and a second power supply path configured to bypass the charging section to connect the electricity reception section to the load, and wherein the received power is supplied to the load through one of the first power supply path or the second power supply path based on a magnitude of the load.

12. The electronic unit according to claim 1, wherein the electricity reception section includes an electricity reception coil configured to receive the received power transmitted based on one of the magnetic field or the electric field.

* * * * *